Feb. 16, 1954 P. H. STEINER 2,669,128
WORM GEARING
Filed Sept. 5, 1952 2 Sheets-Sheet 1

INVENTOR.
PHILIP H. STEINER
BY Edward B. Gregg
Attorney

Feb. 16, 1954   P. H. STEINER   2,669,128
WORM GEARING
Filed Sept. 5, 1952   2 Sheets-Sheet 2
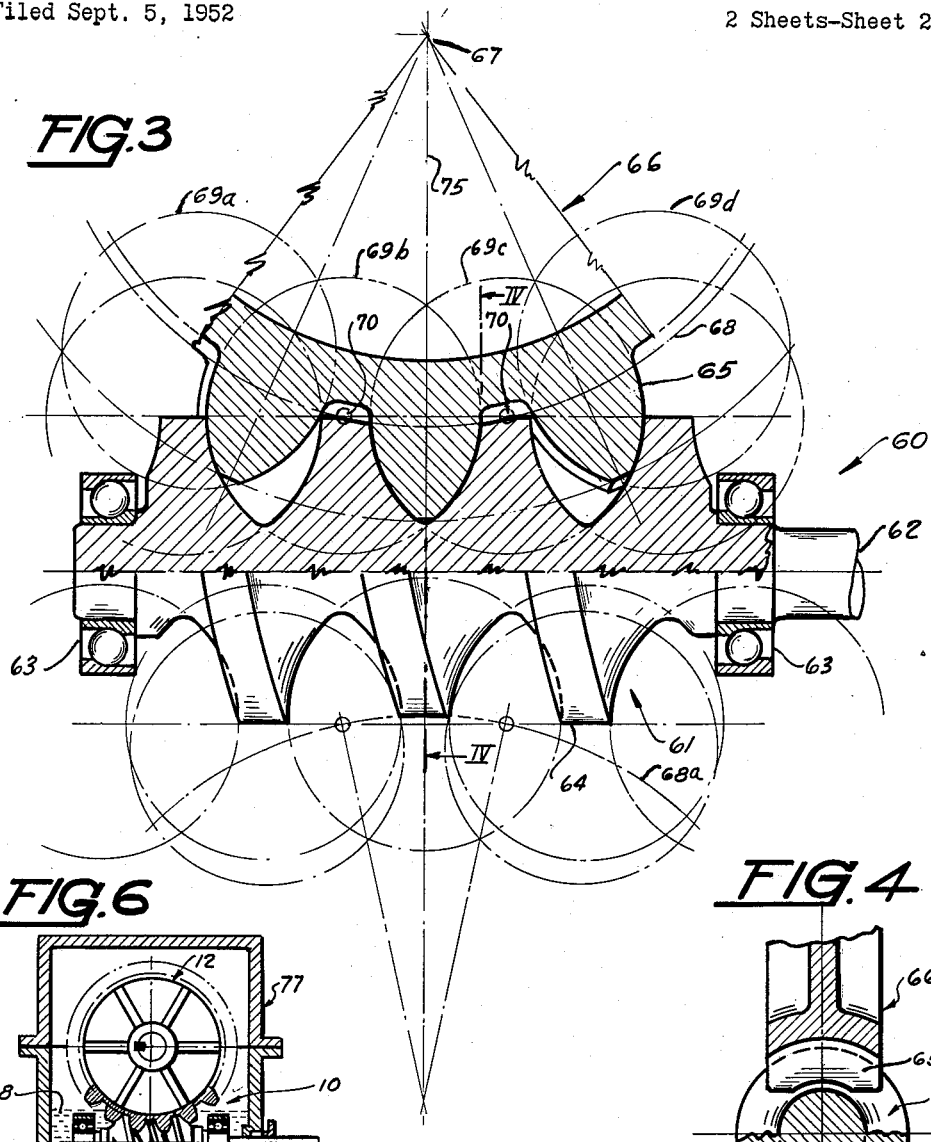
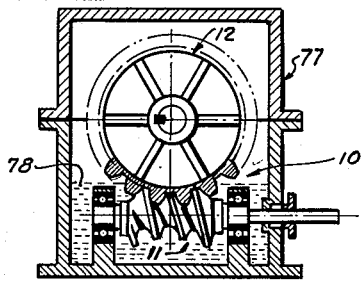
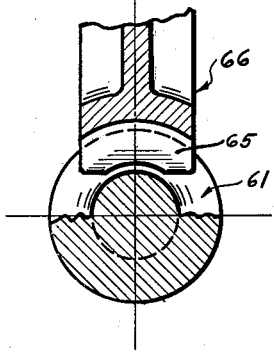
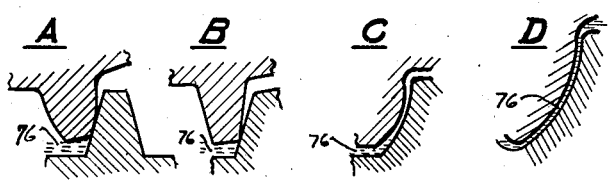
INVENTOR.
PHILIP H. STEINER
BY Edward B. Gregg
Attorney

UNITED STATES PATENT OFFICE 2,669,128

WORM GEARING

Philip H. Steiner, San Francisco, Calif., assignor of one-third to Edward B. Gregg, San Francisco, Calif.

Application September 5, 1952, Serial No. 308,067

6 Claims. (Cl. 74—458)

This invention relates to worm gearing. More particularly, it relates to worm gearing having high capacity for transmitting power in relation to a given size of worm and gear.

This application is a continuation-in-part of my copending application Serial No. 738,542, filed April 1, 1947, entitled "Worm Gearing," now abandoned.

In worm gearing the capacity of the worm and the mating gear to transmit power depends upon the size of the worm and the gearing. Any desired capacity may be achieved simply by constructing the worm and the gear of sufficient size. It is obviously desirable to design the worm thread and gear teeth to provide high capacity with a worm and a gear of relatively small size. This, however, is limited by the mechanical strength of the worm thread and gear teeth and by the efficiency of the thread and teeth in transmitting power from one to the other.

The design of worm gearing heretofore has been inadequate in that, for heavy load transmission, resort has been had largely to large, massive gears and worms. Such large gearing is both expensive and bulky and it introduces considerable inertia.

It is an object of the present invention to provide an improved form of worm gearing.

It is another object of the invention to provide an improved worm thread and mating gear teeth.

Yet another object of the invention is to provide a worm thread and gear teeth of a design which is more efficient for transmission of power.

Still another object of the invention is to provide a worm thread and gear teeth having greater strength for a gear and worm of given size.

These and other objects of the invention will be apparent from the ensuing description and the appended claims.

Certain forms of the invention are illustrated by way of example in the drawings, in which:

Figure 3 is a similar view of yet another embodiment of the invention.

Figure 4 is a fragmentary, transverse staggered section taken through the gearing of Figure 3, the view being taken along the line 4—4 of Figure 3.

Figures 5A, B, C and D show diagrammatically the manner in which the gearing of the present invention entraps and holds lubricant in contrast with conventional gearing.

Figure 6 is a vertical, sectional view showing the worm gearing of the present invention enclosed in a lubricant housing.

Figure 1:
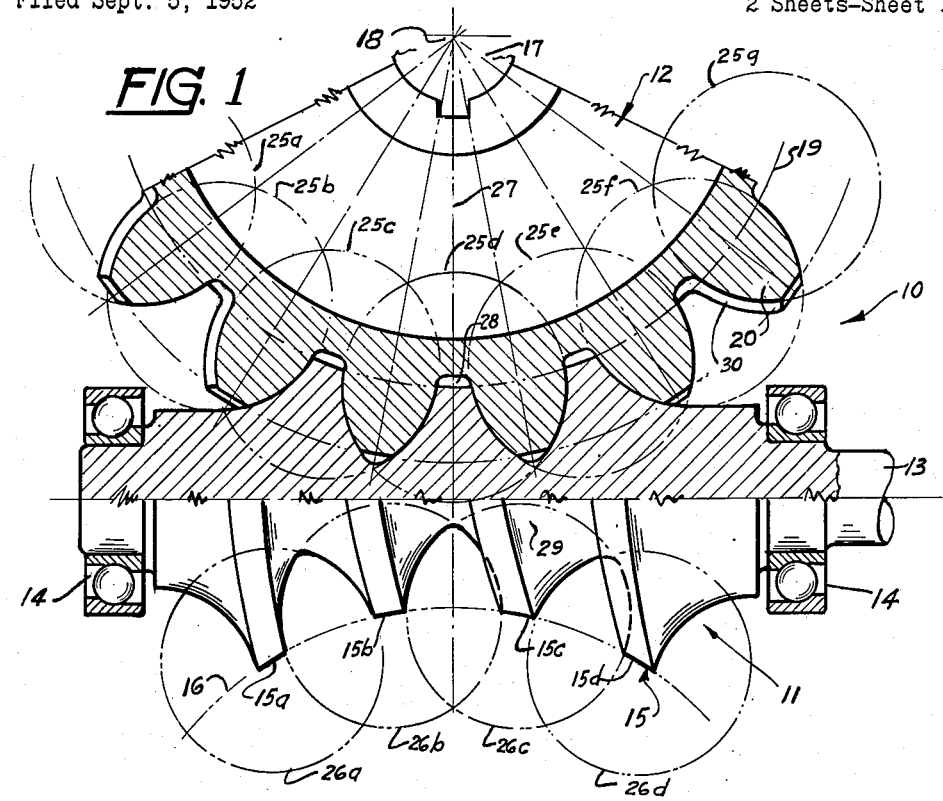
Figure 1 is a view, partly in front elevation and partly in longitudinal, vertical section, of one form of worm gearing constructed in accordance with the present invention.

Referring now to the drawings and more particularly to Figure 1, one form of worm gearing designed in accordance with the invention is there illustrated and is generally designated as 10. The gearing 10 comprises a worm 11 and a mating gear 12. Either of these may be the driving member and the other the driven member. The worm 11 has a shaft 13 which is journaled in bearings 14, and a thread which is generally designated as 15, the individual turns thereof being designated as 15a, 15b, 15c and 15d. The worm thread 15 is of the hour glass type wherein the profile of the worm describes a figure resembling an hour glass as it rotates, such figure being shown at 16. This type of worm is preferred where extra heavy power requirements must be met.

The gear 12 is shown as being keyed to a shaft 17 having its center or axis at 18. The pitch circle of the gear is shown at 19, and the gear is formed with teeth 20. The teeth 20 are designed for full meshing relation with the worm thread 15. The pitch circle 19 has the same radius as the profile of the worm.

There is also shown in Figure 1 an upper set of reference circles 25a, b, c, etc., and a lower set of reference circles 26a, b, c, etc., all of the same radius. There is also shown a vertical reference line 27 which passes through the center 18 of the gear 12 and which bisects the worm thread 15. The said reference circles and the said reference line do not, of course, form parts of the structure illustrated but are used for reference purposes to show the manner in which the faces of the gear teeth and worm thread are developed in accordance with the present invention. Referring to the centrally located reference circle 25d, it will be seen that its center 28 is located at the intersection of the vertical reference line 27 and the pitch circle 19. It will also be seen that the faces 29 of the worm thread 15, which face the point 28 and which are located on the turns 15b and 15d on opposite sides of the point 28, coincide with the reference circle 25d; i. e., the faces 29 are developed as arcs of circles of radius $r$, that being the radius of the circle 25d. The faces 29 of the other turns of the worm thread, are similarly developed, as is indicated by the upper set of circles 25a, b, etc., and the lower set of circles 26a, b, etc.

It will also be apparent that the faces 30 of the gear teeth 20 are similarly developed, i. e., as arcs of circles of radius r. Thus, referring to the two gear teeth on opposite sides of the reference line 27, it will be seen that their faces 30 which face the line 27 coincide with the circle 25d. All of the gear teeth 20 are similarly developed.

In this connection it is desired to point out that the reference circles, or the radius of the faces of the gear teeth and worm thread, may be large or small. However, for large speed ratios of worm to gear I prefer smaller reference circles (i. e., a smaller radius) and for smaller speed ratios of worm to gear I prefer larger reference circles (i. e., a larger radius).

Figure 2:
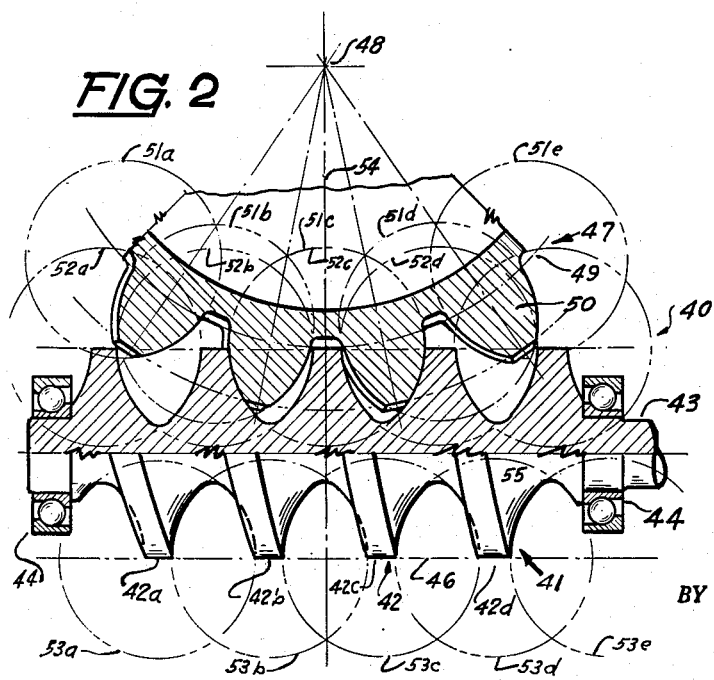
Figure 2 is a similar view of another form of worm gearing constructed in accordance with the present invention.

As stated, the hour glass type of worm thread illustrated in Figure 1 is adapted to extra heavy load requirements. An alternative type of gearing is shown in Figure 2 which embodies the principles of the present invention and which may be used where power requirements are not as great. Referring to Figure 2 the worm gearing is generally designated as 40 and it comprises a worm 41 having a thread 42 and a shaft 43 which is journaled in bearings 44. The helical thread 42 consists, of course, of individual turns 42a, b, etc. The profile of the worm 41 describes an imaginary cylinder 46 as it rotates.

The worm 41 meshes with a gear 47 having its center at 48, having a pitch circle at 49 and having teeth 50. The appropriate reference circles are shown at 51a, b, etc., 52a, b, etc., and 53a, b, etc. The circles 51c and 52c coincide. Also shown is a vertical reference line 54 which passes through the center 48 of the gear and which transects the worm thread. Circles 51a, b, etc., 52a, b, etc. and 53a, b, etc. are of the same radius. Referring to the central circle 51c and to the turns 42b and 42d of the worm thread, the faces 55 thereof which face reference line 54, coincide with the circle 51c. The faces of all the turns of the worm thread 42 are similarly developed, i. e., as arcs of circles of the same radius. The teeth 50 of the gear 47 are similarly developed, as will be apparent from an inspection of Figure 2.

Yet another embodiment of the invention is illustrated in Figure 3 wherein the gearing is generally designated as 60 and comprises a worm 61 having a shaft 62 journaled in bearings 63. The thread 64 of the worm is in full meshing relation with the teeth 65 of a gear 66 having its center at 67 and its pitch circle at 68. In this instance, attention is directed to two reference circles 69b and 69c whose centers 70 are equally spaced from a vertical reference line 75. The reference circles 69a, b, c and d and the other reference circles bear the same relation to the worm thread and the gear teeth shown in Figure 3 that the circles 51a, etc. bear to the worm thread and gear teeth shown in Figure 2. That is, in the embodiment shown in Figure 3 the worm thread and the gear teeth are developed as arcs of circles of the same radius.

It will be apparent that, in the worm gearing 40 of Figure 2, the profile of the worm is tangent to the pitch circle of the gear whereas in the embodiment shown in Figure 3, the profile of the worm intersects the pitch circle of the gear. The embodiment shown in Figure 3 is preferred for medium duty use, the embodiment of Figure 2 for lighter duty and the embodiment of Figure 1 for heavier duty. As indicated, the center turn of the worm thread 61 in Figure 1 is recessed to coincide with the pitch circle 68, which is duplicated at 68a.

Referring now to Figure 5, conventional types of gearing are shown at A, B and C. It will be apparent that a film of lubricant, indicated at 76, will be subjected to forces tending to squeeze it out from between the worm thread and gear teeth, and that the meshing relation of the thread and teeth are not such as to maintain a uniform film of lubricant. In the gearing illustrated in Figure 5D, which is that of the present invention, such tendency is much less likely to occur. A uniform film of lubricant is entrapped between the gear teeth and worm thread and is not squeezed out. This is made possible by the full meshing relation of the gear teeth and worm thread and by the uniform sliding concentric contact between the gear teeth and worm thread.

Referring to Figure 6, one means of lubricating the gearing of the present invention is there illustrated. This means comprises a housing 77 for gearing 10 comprising a worm 11 and a gear 12. A body of lubricant is shown at 78 in which the worm and the lower portion of the gear are submerged.

In Figures 1, 2 and 3 the centers of the reference circles for the worm thread have, as their locus, the profile of the worm thread and the centers of the reference circles for the gear teeth have, as their locus, the pitch circle of the gear. This is the preferred embodiment of the invention, but some departure of these centers from the indicated loci is permissible.

It will, therefore, be apparent that a novel type of gearing has been provided which is capable of transmission under heavy power requirements and whose design is such that exacting conditions can be met without the necessity of resorting to large worms and gears. Also, the design is such as to effectively entrap and hold a uniform film of lubricant between the gear teeth and worm thread.

I claim:

1. A worm gearing comprising an intermeshing worm and gear, said worm having a helical, concave thread and said gear having teeth with convex working faces, said thread and working faces being developed as arcs of circles of the same radius.

2. A worm gearing comprising a worm having a helical thread with concave working faces and a gear having consecutive teeth with convex working faces in full meshing relation with the working faces of the worm thread and for the width of the gear teeth, said faces being developed as arcs of circles of the same radius.

3. A worm gearing comprising a worm having a helical thread with concave working faces and a gear having consecutive teeth with convex working faces in full meshing relation with the working faces of the worm thread and for the width of the gear teeth, said working faces being developed as arcs of circles of the same radius, the centers of the arcs of the gear teeth having as their approximate locus the points of intersection of the pitch line of the gear and radii of the gear bisecting the cavities between gear teeth, each said gear tooth arc having as its center an adjacent point of intersection.

4. A worm gearing of the hour glass type comprising a worm having a helical hour glass thread with concave working faces and a gear meshing with said worm, said worm thread having a height in midsection to coincide with the pitch line of the gear, said gear having consecutive teeth with convex working faces in full meshing relation with the working faces of the worm thread and for the full width of the gear teeth, said working faces being developed as arcs of circles of the same radius and the centers of the arcs of the gear teeth having as their approximate locus the points of intersection of the pitch line of the gear and radii of the gear bisecting the cavities between gear teeth, each said gear tooth arc having as its center an adjacent point of intersection.

5. A worm gearing of the hour glass type, comprising a gear having consecutive teeth with convex working faces forming the arc of a true circle having its center located on the pitch line of said teeth at the center of the space between adjacent teeth respectively; and a worm having a helical thread with an arcuate perimeter concentric with the pitch line of said gear teeth, said worm thread having concave lateral working faces concentric and meshing with the said convex faces of said gear teeth.

6. A worm gearing of the hour glass type, comprising a gear having consecutive teeth separated by an intermediate space between adjacent teeth, with convex working faces each forming the arc of a true circle having its center located substantially on the pitch line of said teeth at the center of said space between adjacent teeth respectively; and a worm having a helical thread with an arcuate perimeter concentric with the pitch line of said gear teeth, said worm thread having concave lateral working faces each forming the arc of a true circle and in contact with said convex working faces of said teeth with which the worm is meshed.

PHILIP H. STEINER.

No references cited.